United States Patent
Bruno et al.

(10) Patent No.: US 6,356,533 B1
(45) Date of Patent: Mar. 12, 2002

(54) APPARATUS AND METHOD FOR SELECTING COMMUNICATION MODES

(75) Inventors: Richard Frank Bruno, Morristown; Howard Paul Katseff, Englishtown; Robert Edward Markowitz, Glen Rock; Bethany Scott Robinson, Lebanon, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/130,982

(22) Filed: Aug. 7, 1998

(51) Int. Cl.$^7$ ................................................ H04L 12/56
(52) U.S. Cl. ........................ 370/252; 370/426; 370/465
(58) Field of Search ................................ 370/252, 253, 370/254, 255, 257, 258, 401, 402, 403, 404, 405, 410, 422, 423, 424, 426, 465, 466, 522; 709/227, 228, 230, 231, 232, 236, 244, 249

(56) References Cited

U.S. PATENT DOCUMENTS

| | | | |
|---|---|---|---|
| 5,724,355 A | | 3/1998 | Bruno et al. ................ 370/401 |
| 5,889,954 A | * | 3/1999 | Gessel et al. ............... 709/223 |
| 6,058,115 A | * | 5/2000 | Sawyer et al. .............. 370/401 |
| 6,125,122 A | * | 9/2000 | Favichia et al. ............ 370/466 |
| 6,169,739 B1 | * | 1/2001 | Isoyama ..................... 370/395 |
| 6,205,148 B1 | * | 3/2001 | Takahashi et al. .......... 370/401 |

\* cited by examiner

Primary Examiner—Kwang B. Yao
(74) Attorney, Agent, or Firm—Oliff & Berridge, PLC

(57) ABSTRACT

The present invention provides an apparatus and method that allows the communication mode for communicating between two user devices to be selected based on the abilities of the user devices and/or the preferences of the users. Using the present invention, when an operator of a user device enters the destination address for another user device with which communication is sought, a Client Routing Assessment Profile Services (CRAPS) processor receives the signals from the source user device. The signals include information of the identity of the source user device and the destination user device. The CRAPS processor retrieves profile information from a database corresponding to the identity of the source user device and/or the destination user device. Based on the profile information retrieved, the CRAPS processor sends boot signals to the user devices involved in the communication instructing them to change to the appropriate communication mode. Once the user devices are operating in the same mode, the CRAPS processor enables the communication between the user devices until an end condition occurs.

16 Claims, 5 Drawing Sheets

FIG. 5

| | 502 | 503 |
|---|---|---|
| | 59823468 | H.320 |
| | 62149874 | TCP/IP |
| | 84321798 | H.323 |
| | 5556794 | ANALOG |
| 800-555-5555 | 8888881 | CABLE |
| | 453276 | TELEPHONY |
| | 443322 | H.323 |
| | 111111 | ISDN |
| | 987653 | ANALOG |
| | 210987 | H.323 |
| | 55443321 | H.320 |
| | 44332210 | H.320 |
| | 5436789 | H.320 |
| | 1234567 | TCP/IP |
| 555-444-2233 | 894785 | TCP/IP |
| | 613254 | ANALOG |
| | 413287 | H.323 |
| | 994567 | CABLE |
| | 884321 | TELEPHONY |
| | 549987 | ISDN |

501

APPARATUS AND METHOD FOR SELECTING COMMUNICATION MODES

BACKGROUND OF THE INVENTION

1. Field of Invention

The present invention is directed to an apparatus and method for selecting communication modes. More specifically, the present invention provides an apparatus and method for selecting communication modes based on the abilities of the endpoint devices and/or the preferences of the users.

2. Description of Related Art

Communication over communication networks using different communication modes is generally known in the art. Communication in networks using a number of different modes such as H.320, TCP/IP, analog and the like, is well known. However, in these communication networks, typically the endpoint devices that are communicating with one another use only one communication mode and must communicate with one another over that particular mode. There is no ability to choose between a plurality of communication modes when communicating with another endpoint device. Thus, new technology is needed to provide a means by which communication modes may be selected based on the abilities of the endpoint devices.

SUMMARY OF THE INVENTION

The present invention provides an apparatus and method that allows the communication mode for communicating between two user devices to be selected based on the abilities of the user devices and/or the preferences of the users. Using the present invention, when an operator of a source user device enters the destination address for another user device with which communication is sought, a Client Routing Assessment Profile Services (CRAPS) processor receives the signals from the source user device. The signals include information of the identity of the source user device and the destination user device.

The CRAPS processor retrieves information from a database corresponding to the identity of the source user device and/or the destination user device. The information includes the types of communication modes available to be used during the communication and may include a preferred communication mode for use during the communication.

Based on the information retrieved, the CRAPS processor sends boot signals to the necessary user devices involved in the communication instructing them to change to the appropriate communication mode. Once the user devices are operating in the same mode, the CRAPS processor enables the communication between the user devices until an end condition occurs.

These and other features and advantages will be described in or are apparent from the following detailed description of the preferred embodiments.

BRIEF DESCRIPTION OF THE DRAWINGS

The preferred embodiments of the present invention will be described with reference to the following figures, wherein like numerals designate like elements, and wherein:

FIG. 5 is an example data structure according to the third embodiment of the present invention.

DETAILED DESCRIPTION OF PREFERRED EMBODIMENTS

Figure 1:
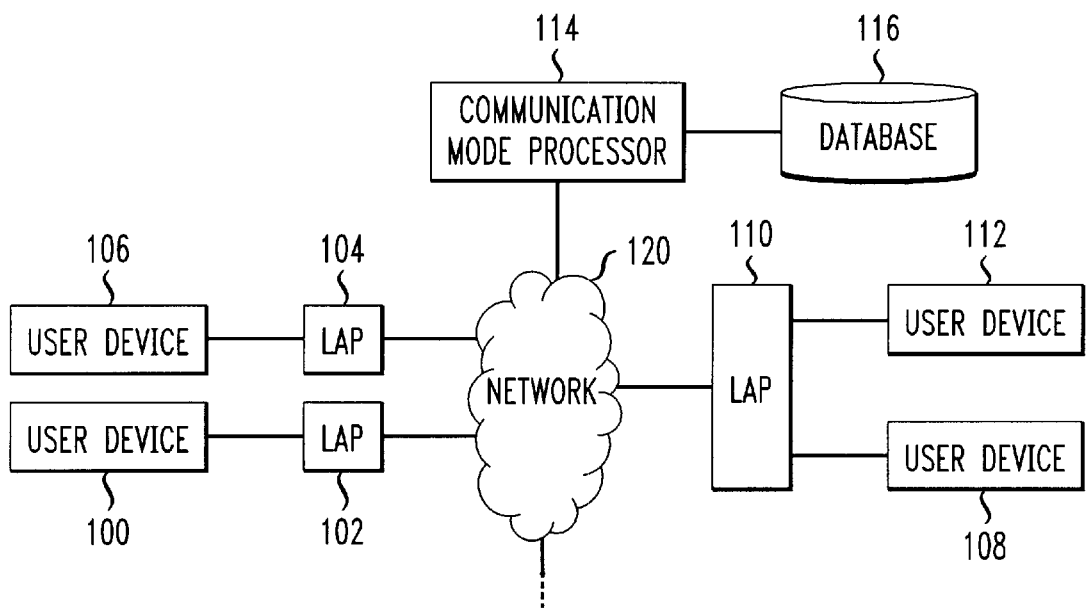
FIG. 1 is an exemplary block diagram of a communication system in which the present invention operates.

FIG. 1 is an exemplary block diagram of a system in which the present invention operates. The system includes a plurality of user devices 100, 106, 108 and 112 in communication with at least one network 120 through Local Access Providers (LAPs) 102, 104 and 110. The user devices 100, 106, 108, and 112 communicate with one another through the network 120. The network 120 is further in communication with a CRAPS processor 114. The CRAPS processor 114 is in communication with a database 116.

If the operator of the user device 100 wishes to communicate with the user device 112, the operator need only activate the user device 100 and enter the destination address, for example the telephone number, Universal Resource Locator (URL), TCP/IP address, and the like, of the user device 112. Once a connection is established, communication between the user devices 100 and 112 may commence.

The user devices 100, 106, 108 and 112 may be any devices that allow for the transmission of signals over communications links. For example, the user devices 100, 106, 108 and 112 may be land-line telephones, cellular telephones, computers, personal assistants, point of sale devices, video telephones, video conference apparatuses, smart TVs, and the like.

The user devices 100, 106, 108 and 112 may be multiple use terminals (MUTs) or may be single use devices. The MUTs are able to operate in a plurality of communication modes and are capable of switching between communication modes during operation. The single use devices may operate in only one communication mode. For example, the user device 100 may be capable of operating in analog, H.320 and TCP/IP modes while user device 108 may be capable of only operating in analog.

The user devices 100, 106, 108 and 112 are in communication with the network 120 through LAPs 102, 104 and 110 over communications links. These communications links may be any type of connection that allows the transmission of information. Some examples include conventional telephone lines, fiber optic lines, direct serial connection, cellular telephone connections, satellite communication and the like.

The user devices 100, 106, 108 and 112 send communication signals to one another over the communications links through LAPs 102, 104 and 110. The LAPs 102, 104 and 110 are devices that provide an interface to the network 120. The LAPs 102, 104 and 110 may include Local Exchange Carriers (LECs), Internet Access Providers (IAPs), satellite base stations, and the like.

The communication signals are received by the network 120 and are routed in the network 120 to the destination user device. The routing may be performed by switches such as Lucent Technologies Inc. 5ESS and 4ESS switches, for example, which are generally known in the art.

The network 120 may be a single network or a plurality of networks of the same or different types. For example, the network 120 may include a local telephone network (such as a Bell Atlantic telephone network) in connection with a long distance network (such as an AT&T long distance telephone network). Further, the network 120 may be a data network or a telecommunications network in connection with a data network.

The network 120 is further in communication with at least one CRAPS processor 114. The CRAPS processor 114 controls the setting of communication modes used during the communication between a source user device (i.e. the user device initiating the communication) and a destination user device as described below.

When the operator of a user device, for example user device 100, enters the destination address for a user device with which communication is sought, for example the user device 112, the CRAPS processor 114 receives signals from the user device 100 regarding the identity of the user device 100 and of the destination user device 112. The CRAPS processor 114 retrieves profile information from the database 116 corresponding to the identity of the user device 100 and/or the destination user device 112. The profile information includes the types of communication modes available to be used during the communication and may include a preferred communication mode for use during the communication, along with other relevant information.

Based on the profile information retrieved, the CRAPS processor 114 sends boot signals to the necessary user devices 100, 112 involved in the communication instructing them to change to the appropriate communication mode. Once the user devices 100, 112 involved in the communication are operating in the same mode, the CRAPS processor 114 enables the communication between the user devices 100, 112 until an end condition occurs.

Using the above architecture, the communication mode of the user devices 100, 106, 108 and 112 can be selected based on the identity of the user devices 100, 106, 108 and 112 and profile information stored in a database 116. Thus, the communication mode may be selected based on the abilities of the devices involved in the communication and the preferences of the users.

Figure 2:
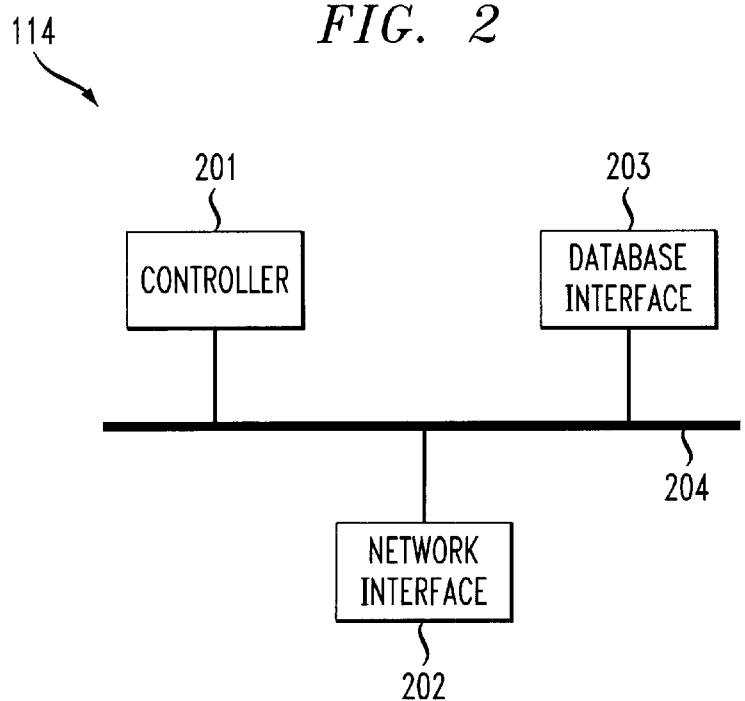
FIG. 2 is a block diagram of the CRAPS processor of FIG. 1.

FIG. 2 is a block diagram of the CRAPS processor 114 of FIG. 1. The CRAPS processor 114 includes a controller 201, a network interface 202, a database interface 203 and a bus 204. The controller 201 controls the operation of the CRAPS processor 114 and directs communication between itself and the interfaces 202 and 203. The network interface 202 provides a communication pathway between the controller 201 and the network 120. The database interface 203 provides a communication pathway between the controller 201 and the database 116. The controller 201 and interfaces 202 and 203 communicate with one another over the bus 204.

The operation of the CRAPS processor 114 will now be explained with reference to an example of a first embodiment of the present invention. In this example, it is assumed that two user devices 100 and 112 involved in the communication are MUTs. However, the example operation is also applicable when one of the user devices is a single use device.

When an operator of the user device 100 wishes to communicate with the operator of the user device 112, for example, the operator of user device 100 selects the mode he/she wishes to use and enters the address of the user device 112 into the user device 100. The operator selects the communication mode to be used by way of, for example, booting the user device 100 in the selected communication mode, selecting the communication mode from a list of available modes, and the like.

The user device 100 transmits a start-up message to the CRAPS processor 114 containing identification information identifying the source user device 100 and the destination user device 112 and the mode that is desired to be used. The controller 201 of the CRAPS processor 114 receives the start-up signal through the network interface 202. The controller 201 then retrieves profile information corresponding to the destination user device 112 from the database 116 through the database interface 203. The profile information retrieved from the database 116 includes a listing of the available modes that may be used when communicating with the destination user device 112.

Figure 3:
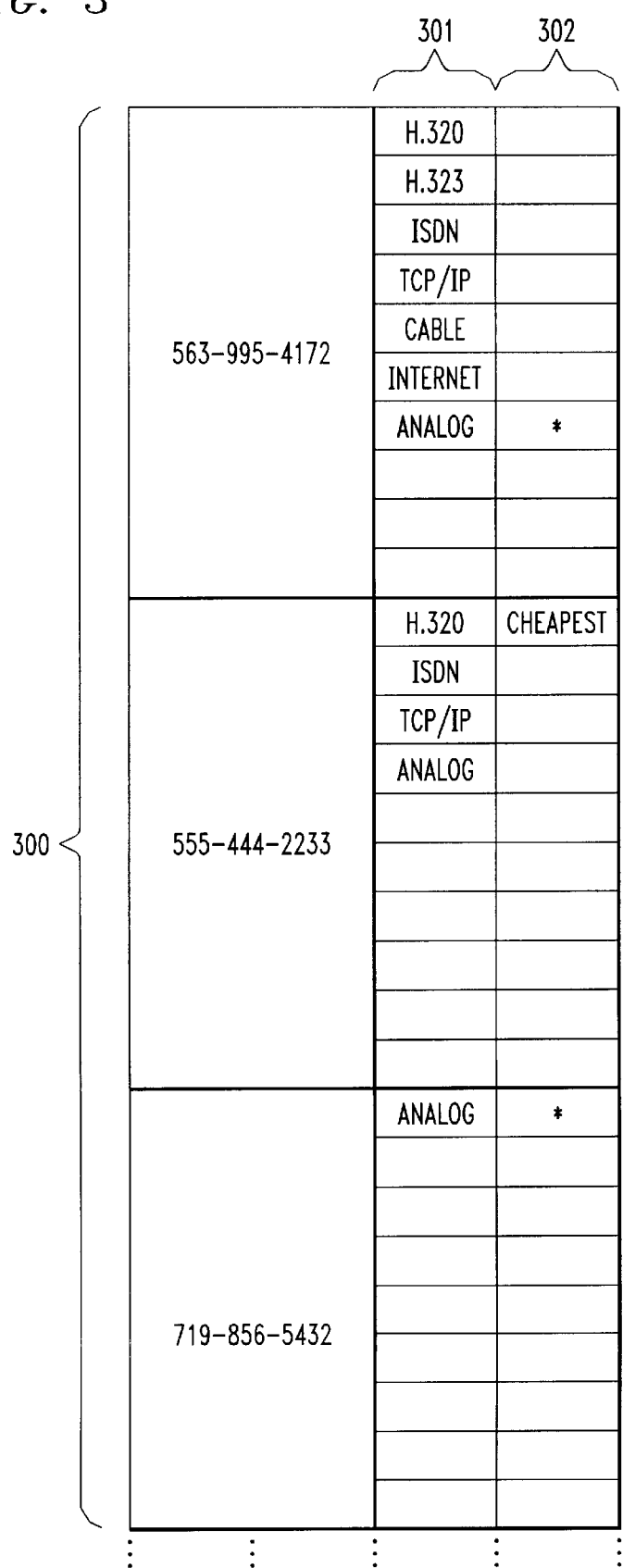
FIG. 3 is a example data structure according to a first embodiment of the present invention.

FIG. 3 is an example of a data structure of the database 116 according to the first embodiment. As shown in FIG. 3, the data structure contains a listing of destination numbers 300, a listing of their available communication modes 301, and a default mode 302 corresponding to each of the destination numbers 300. Thus, when the CRAPS processor 114 retrieves profile information from the database 116 corresponding, for example, to the destination user device number 555-444-2233, the available modes H.320, ISDN, TCP/IP and analog are retrieved.

Alternatively, the CRAPS processor 114 may query the destination user device 112 directly for the communication modes that are useable by the destination user device 112. However, having to query the destination user device 112 tends to slow down the operation of the CRAPS processor 114. The use of a database 116 to store profile information that is retrievable by the CRAPS processor 114 increases the speed with which communication can be initiated.

Likewise, the source user device 100 may attempt to establish a communication link with the destination user device 112 directly without consulting the CRAPS processor 114. However, establishing communication in this manner is inefficient since it requires a trial and error process to determine the communication mode that may be used by both the source and destination user devices 100 and 112. Thus, many attempts to establish communication may be necessary before an actual communication link can be established. Accordingly, in the preferred embodiments of the present invention, the CRAPS processor 114 is utilized for establishing communication between the source and destination user devices 100 and 112.

The controller 201 determines if the desired mode is included in the available modes of the destination user device 112. If it is, then a boot signal is sent to the destination user device 112 causing the destination user device 112 to operate in the desired mode.

If the desired mode is not included in the list, a default mode, such as an analog mode, may be selected or an "unable to complete communication using selected mode" message will be sent to the source user device 100. The default mode may be set in the default field 302 of the data structure in FIG. 3 or may be a generally set default mode of the CRAPS processor 114. The default will generally be set as a mode in which all user devices are considered to be able to operate. However, any mode may be set as the default.

The "unable to complete communication using selected mode" message may further provide a listing of the modes useable by the destination user device 112 and request that the source user device 100 select a different mode. The process may be repeated until an appropriate mode is chosen and the communication is enabled or the source user device 100 cancels the communication.

Alternatively, if a default mode is selected, the user devices 100 or 112 may be given an opportunity after communication is initiated to upgrade the communication mode from the default mode. The opportunity may be provided, for example, by a message sent from the CRAPS processor 114 indicating the available communication modes and requesting the source user device 100 to select a mode from the list or remain in the default communication mode. For example, a source user device 100 may upgrade from a default mode of analog to H.320 mode (assuming that the destination user device 112 is capable of operating in this mode) after initiating communication with the destination user device 112 in the default mode.

Likewise, the destination user device 112 may upgrade the communication mode based on certain criteria such as whether the source user device 100 represents a new customer (cheapest mode), valued repeat customer (highest quality), and the like. The switch to the new communication mode can be performed by sending a boot signal from the CRAPS processor 114 to both user devices 100 and 112 instructing them to boot into the new communication mode.

The messages sent to the user device 100 may be in the form of graphical messages to be displayed, such as text and/or graphics, audible messages, or a combination of graphical and audible messages. Responses to the messages may be entered through the user device 100 by using a user interface such as a keyboard, microphone, speech recognition device, pointing device, telephone keypad, telephone handset, and the like.

As a practical example of the operation of the CRAPS processor 114, consider a person, Robert, wishing to communicate with a friend, Richard, using a MUT in video conference mode. Robert initiates the communication by turning on the MUT, selecting the H.320 mode (used for video conferences) and entering Richard's telephone number.

The signals sent from Robert's MUT are routed by the network 120 to the CRAPS processor 114. The CRAPS processor 114 receives the signals from Robert's MUT and retrieves information from the database 116 corresponding to Richard's telephone number. The information indicates that Richard does not have the capability of communicating using the H.320 mode selected by Robert. However, Richard can communicate using analog and Internet telephony. Thus, the CRAPS processor 114 sends a message to Robert indicating that the communication cannot be completed using the selected mode and requesting Robert to choose between analog and Internet telephony to complete the connection to Richard. Robert chooses the Internet telephony mode and the CRAPS processor 114 sends boot signals to Robert and Richard's MUTs instructing them to use Internet telephony during the communication. Thus, the CRAPS processor 114 would then send a boot signal to Robert and Richard's user devices to initiate ISP logon and direct communication to the other of the user devices' IP address and thereby complete the communication connection.

Alternatively, when it is determined that Richard cannot communicate in H.320 mode, the CRAPS processor 114 may automatically send boot signals to both Robert and Richard's user devices instructing them to boot in a default mode. The default mode may be set in the profile information retrieved from the database 116 or may be a generally set default of the CRAPS processor 114. For the above example, the default may be set as Internet telephony. In this case, the CRAPS processor 114 would automatically send a boot signal to Robert and Richard's user devices to initiate ISP logon and direct communication to the other of the user devices' IP address.

Likewise, the default may be set as "cheapest" or "highest quality" or the like in the default field 302 of the data structure of FIG. 3. In this case the CRAPS processor 114 would retrieve the entry in the default field 302 when retrieving the profile information from the database 116 corresponding to both the source user device 100 (Robert) and the destination user device 112 (Richard). Based on the entry in the default field 302 of the source user device 100, assuming the source user device 100 is paying for the communication, the CRAPS processor 114 would choose a communication mode from the communication modes useable by both the source user device 100 and the destination user device 112 corresponding to the chosen default. Thus, assuming Robert's default is set as "cheapest", since both Robert and Richard are able to communicate in both analog and Internet telephony and Internet telephony is cheaper than analog, the default mode for the communication would be set as Internet telephony.

Figure 4:
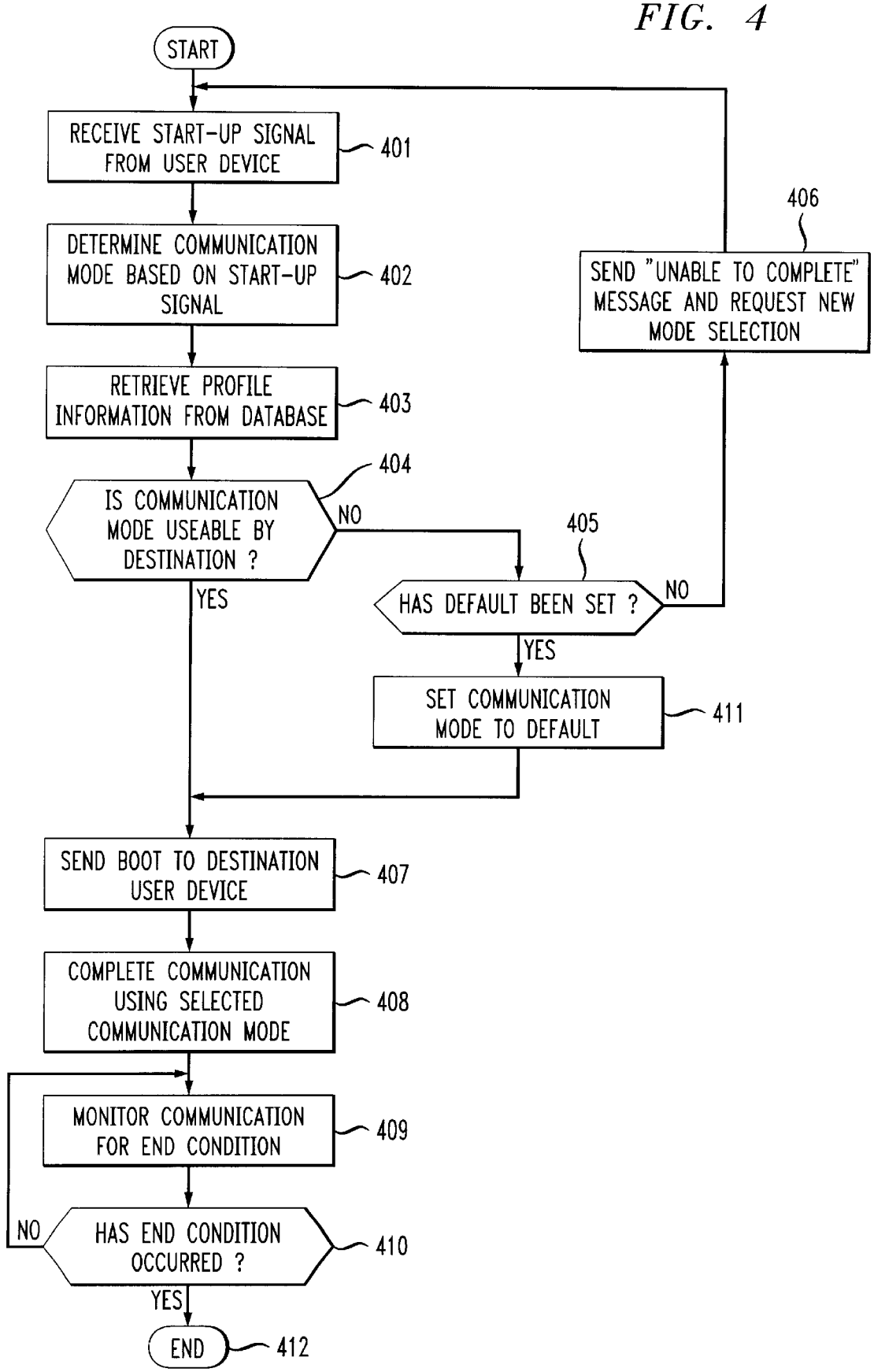
FIG. 4 is a flowchart of the operation of the present invention according to a first embodiment.

FIG. 4 is a flowchart of the operation of the CRAPS processor 114 according to the first embodiment. In step 401, the controller 201 receives a start-up signal through the network interface 202 from a source user device 100, for example, and goes to step 402. The start-up signal includes identifying information that identifies the source and destination user devices 100 and 112, for example. In step 402, the controller 201 determines the communication mode selected by the source user device 100 and goes to step 403.

In step 403, the controller 201 retrieves profile information from the database 116 through database interface 203 corresponding to the destination user device 112 identified in the start-up signal and goes to step 404. In step 404, the controller 201 determines if the communication mode is useable by the destination user device 112. As described above, this determination is made by checking the retrieved list of available communication modes for the destination user device 112 for the occurrence of the selected communication mode.

If the communication mode exists in the list of available communication modes, the controller 201 continues to step 407; otherwise the controller 201 goes to step 405. In step 405, if a default communication mode has been set, the controller 201 goes to step 411; otherwise the controller 201 goes to step 406. In step 411, the controller 201 sets the communication mode based on the default communication mode and goes to step 407.

In step 406, a message is sent to the source user device 100 indicating that the communication could not be completed using the selected communication mode and requesting that another communication mode be chosen from the list of available communication modes for the destination user device 112. The controller 201 then returns to step 401 where the selected communication mode is received as a start-up signal from the user device.

In step 407, the controller 201 sends a boot signal to the destination user device 112 through the network interface 202 causing the destination user device 112 to change to the selected communication mode (if not already using the selected communication mode), and the controller 201 goes to step 408. In step 408, the controller 201 completes the connection between the source user device 100 and the destination user device 112 using the selected communication mode.

In step 409, the controller 201 monitors the communication until an end condition occurs and goes to step 410. In step 410, if it is determined that the end condition has occurred, the controller 201 goes to step 412 and ends;

otherwise the controller 201 returns to step 409 and continues to monitor the communication for the end condition. The end condition may be, for example, the disconnection of one of the user devices 100 or 112, and the like.

A second embodiment of the present invention recognizes that in outbound calling, different modes of communication have differing costs associated with them. For example, the costs of communication increase as follows: Internet telephony (the cheapest), analog (slightly more costly), Cable, ISDN, and H.320 (most costly). The increased cost of the communication modes reflects the increased quality and abilities of the communication modes. For example, Internet telephony provides a low quality voice communication while H.320 provides a high quality video communication.

In the second embodiment, when a user wishes to initiate a communication using a MUT, such as a public pay MUT, the user first enters an account number, such as a credit card number, calling card number, telephone number and the like, before entering the destination number. For security, the user may also be required to enter a personal identification number (PIN), home zip code, social security number, home telephone number, or the like. Once the destination number is entered, and before choosing a communication mode, the signal from the MUT is sent to the CRAPS processor 114. The CRAPS processor 114 retrieves profile information from the database 116 pertaining to the destination number and determines which communication modes may be used when communicating with the destination number. The user is then presented with a list of the available communication modes and the corresponding cost. The user may then choose the communication mode that they are willing to pay for when communicating with the destination number. The charges for the communication will then be billed to the account number entered by the user at the cost identified by the list provided to the user.

In a third embodiment in which, for example, there is an incoming call to a toll-free number, the destination user device 112 chooses the mode of communication. In this embodiment, a user initiates a communication by entering a destination number of user device 112 through the user device 100. The signal from the user device 100 is sent to the CRAPS processor 114 where the CRAPS processor 114 determines the source user device 100 and the destination user device 112. The CRAPS processor 114 then retrieves information from the database 116 corresponding to the destination user device 112.

FIG. 5 is an example of the data structure of the database 116 according to the third embodiment of the present invention. The data structure includes fields for a destination number 501, fields for source user device identifiers 502 and fields for the preferred communication mode of the source user device 503 used in profile routing.

The CRAPS processor 114 searches the source user device identifier field 502 of the information retrieved from the database 116 for an entry corresponding to the source user device 100. If the source user device 100 is listed in the retrieved information, the CRAPS processor 114 uses the mode corresponding to the source user device 100 in the retrieved information. Otherwise, the CRAPS processor 114 uses a default mode, such as analog or Internet telephony. The CRAPS processor 114 then sends boot signals to both the source user device 100 and destination user device 112 instructing them to change into the selected mode. The connection between source user device 100 and destination user device 112 is then established.

As a practical example of the third embodiment, consider a user communicating with a toll-free service such as, for example, an airline information and reservation telephone line. When the user enters the toll-free number into the user device, a signal is sent to the CRAPS processor 114 identifying the user device and the toll-free number. The CRAPS processor 114 then retrieves information corresponding to the toll-free number from the database 116. The CRAPS processor 114 then searches the retrieved information for a listing of the user device. If the user device is present in the list, the corresponding communication mode is used during the communication. Otherwise, a default communication mode is selected.

In this way, the toll-free service provider may choose the communication mode, and therefore the type of experience that the user will enjoy, based on the value attributed to the user's potential business. Thus, a user that has been designated as a valuable customer, such as a member of the airline's "Admirals Club", frequent flyer club, and the like, may be provided with the most expensive communication mode H.320 providing him with a video and audio experience in an effort to maintain the customer's valued business. Meanwhile, a customer whose business has been designated as being of less importance may be provided with a less expensive communication mode such as analog.

Likewise, different communication modes may be used for different operations. Thus, for example, if a customer is viewing personal financial information, the most expensive communication mode is used in an effort to entice the customer to maintain their account with the financial management institution. On the other hand, a new customer may be provided with a cheaper communication mode until an account is established.

Similarly, the communication mode may be selected to provide the most security for the customer. For example, if a customer is viewing personal financial information and wishes it to be secured from access by would-be interlopers, the communication mode may be selected to provide, for example, IP communication over H.320 communication links as described in commonly assigned U.S. Pat. No. 5,724,355 to Bruno et al. which is hereby incorporated by reference.

The identification of users may be further enabled by having the user enter an identifying code, such as a frequent flyer account number, personal identification number, credit card number, promotional code number from an advertisement, and the like. Thus, the CRAPS processor 114 may then identify each user personally and provide an experience based on the identity of each individual user.

Figure 6:
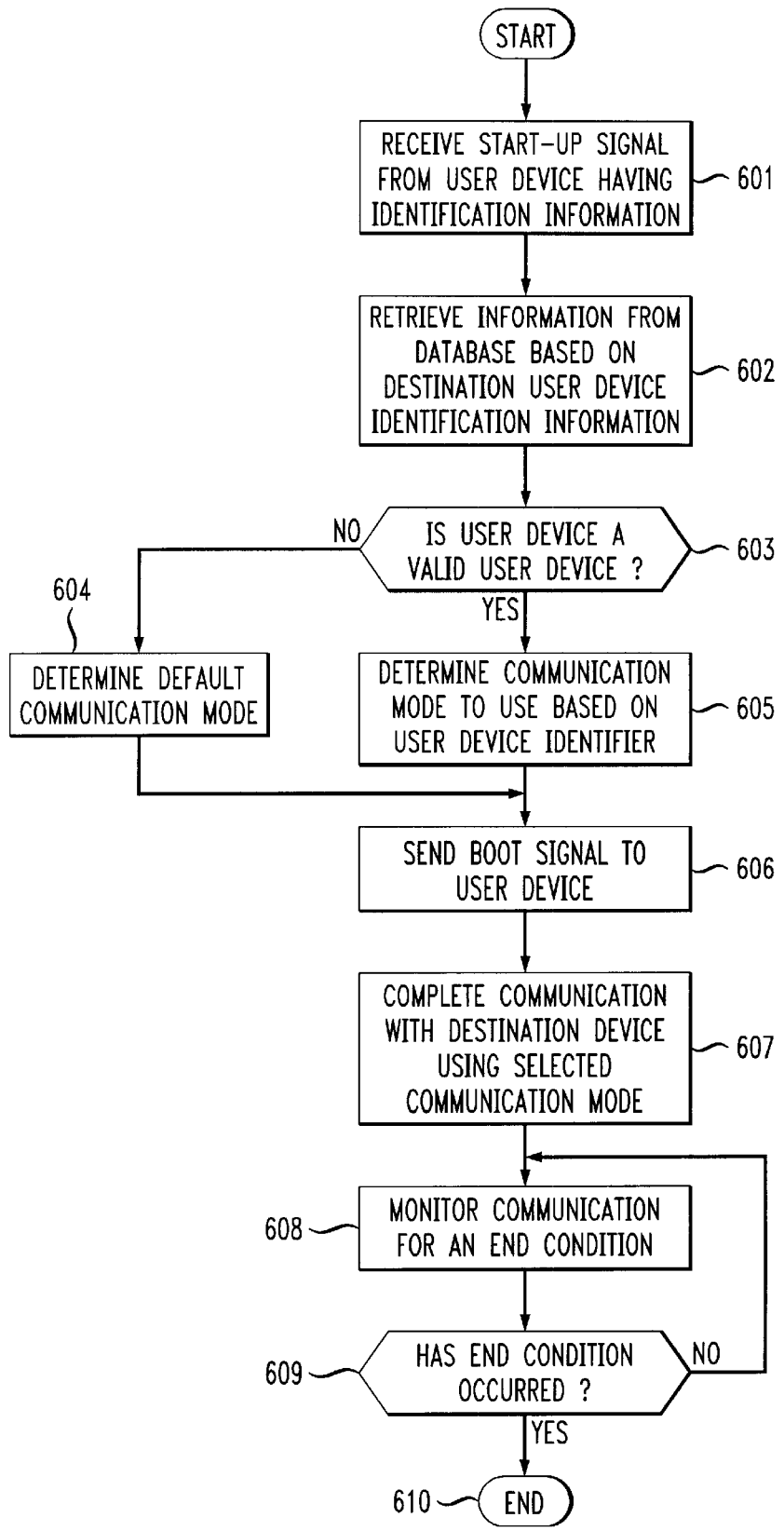
FIG. 6 is a flowchart of the operation of the present invention according to a third embodiment.

FIG. 6 is a flowchart of the operation of the CRAPS processor 114 according to the third embodiment of the present invention. In step 601, the controller 201 receives a start-up signal through the network interface 202 from a source user device 100, for example, and goes to step 402. The start-up signal includes identifying information that identifies the source and destination user devices and/or the identity of the individual user.

In step 602, the controller 201 retrieves profile information from the database 116 corresponding to the destination user device identification information and goes to step 603. In step 603, the controller 201 searches the retrieved profile information for the occurrence of the source user device and/or identity of the individual user. If the user device 100 or individual user is present in the retrieved profile information, control continues to step 605; otherwise control goes to step 604. In step 604, the controller 201 determines that a default communication mode is to be used and goes to step 606.

In step 605, the controller 201 determines the communication mode based on the profile information retrieved corresponding to the user device information and/or individual user identity and goes to step 606.

In step 606, the controller 201 sends boot signals to the source user device 100 and the destination user device 112, for example, instructing them to change to the selected communication mode and goes to step 607.

In step 607, the controller 201 completes the connection between the source user device 100 and the destination user device 112 using the selected communication mode and continues to step 608. In step 608, the controller 201 monitors the communication for an end condition, such as the disconnection of one of the user devices 100, 112, and goes to step 609. In step 609, if an end condition occurs, the controller 201 goes to step 610 and ends; otherwise the controller 201 returns to step 608 and continues to monitor the communication.

As shown in FIG. 2, the method of this invention is preferably implemented on a programmed processor. However, the communication mode processor 114 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowchart shown in FIGS. 4 and 6 can be used to implement the communication mode processor 114 functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of establishing a communication connection between a source device and a destination device over a network, comprising:

identifying a communication mode useable by both the source device and the destination device;

establishing a communication connection between the source device and the destination device using the identified communication mode; and sending boot signals to at least one of the source device and destination device, the boot signals causing at least one of the source device and destination device to boot into the identified communication mode.

2. The method of claim 1, further comprising:

receiving communication signals from the source device identifying the destination device; and retrieving information from a database indicating a list of the communication modes useable by the destination device.

3. A method of establishing a communication connection between a source device and a destination device over a network, comprising:

identifying a communication mode useable by both the source device and the destination device;

establishing a communication connection between the source device and the destination device using the identified communication mode;

sending a request message to the source device, the request message identifying a list of communication modes useable by the destination device and requesting that the source device identify a selected communication mode from the list of communication modes; and receiving the selected communication mode from the list of communication modes.

4. The method of claim 3, wherein the communication signals include information identifying a preferred communication mode, the method further comprising:

determining if the preferred communication mode is in the list of communication modes retrieved from the database;

sending a request message to the source device if the preferred communication mode is not in the list of communication modes retrieved from the database, the request message identifying the list of communication modes useable by the destination device and requesting that the source device identify a selected communication mode from the list of communication modes; and receiving the selected communication mode from the list of communication modes.

5. The method of claim 3, wherein the list of communication modes includes at least one of analog, H.320, H.323, Cable, TCP/IP, Internet telephony, and ISDN.

6. The method of claim 3, wherein the communication signals include information identifying a preferred communication mode, the method further comprising:

determining if the preferred communication mode is in the list of communication modes retrieved from the database; and selecting a default communication mode if the preferred communication mode is not in the list of communication modes retrieved from the database.

7. The method of claim 3, further comprising:

receiving a user identifier and a destination identifier;

retrieving information from a database indicating a preferred communication mode based on the destination identifier and the user identifier.

8. The method of claim 7, wherein the user identifier includes at least one of a personal identification number, a telephone number, a credit card number, calling card number, home zip code, social security number, and an account number.

9. A communication apparatus for establishing a communication connection between a source device and a destination device over a network, comprising:

a controller; and a memory, the controller identifying a communication mode useable by both the source device and the destination device based on information retrieved from the memory and establishing a communication connection between the source device and the destination device using the identified communication mode, wherein the controller sends boot signals to at least one of the source device and the destination device, the boot signals causing at least one of the source device and the destination device to boot into the identified communication mode.

10. The communication apparatus of claim 9, further comprising a network interface through which communication signals from the source device are received, the communication signals identifying the destination device, wherein the information retrieved from the memory indicates a list of the communication modes useable by the destination device.

11. A communication apparatus for that establishes a communication connection between a source device and a destination device over a network, comprising:

a controller; and a memory, the controller identifying a communication mode useable by both the source device and the destination device from information retrieved from the memory, and establishing a communication connection between the source device and the destination device using the identified communication mode, the controller sending a request message to the source device, the request message identifying a list of communication modes useable by the destination device, and requesting that the source device identify a selected communication mode from the list of communication modes, the controller receiving the selected communication mode from the list of communication modes.

12. The communication apparatus of claim 11, wherein the communication signals further include information identifying a preferred communication mode, and wherein the controller:

(1) determines if the preferred communication mode is in the list of communication modes retrieved from the memory, (2) sends a request message to the source device is the preferred communication is not in the list of communication modes retrieved from the database, the request message identifying the list of communication modes useable by the destination device and requesting that the source device identify a selected communication mode from the list of communication modes, and (3) receives the selected communication mode from the list of communication modes.

13. The communication apparatus of claim 11, wherein the communication signals further include information identifying a preferred communication mode, and wherein the controller:

(1) determines if the preferred communication mode is in the list of communication modes retrieved form the memory, (2) selects a default communication mode if the preferred mode is not in the list of communication modes retrieved from the memory.

14. The communication apparatus of claim 11, wherein the list of communication modes includes at least one of analog, H.320, H.323, Cable, TCP/IP, Internet telephony, and ISDN.

15. The communication apparatus of claim 11, wherein the controller receives a user identifier and destination identifier and retrieves information from the memory indicating a preferred communication mode based on the destination identifier and the user identifier.

16. The method of claim 15, wherein the user identifier includes at least one of a personal identification number, a telephone number, a credit card number, a calling card number, a home zip code, a social security number, and an account number.

* * * * *